United States Patent [19]
Komai et al.

[11] Patent Number: 4,464,668
[45] Date of Patent: Aug. 7, 1984

[54] INK SUPPLY SYSTEM OF INK JET RECORDING APPARATUS

[75] Inventors: Hiromichi Komai; Minoru Ameyama, both of Yokohama, Japan

[73] Assignee: Ricoh Company, Ltd., Japan

[21] Appl. No.: 462,420

[22] Filed: Dec. 20, 1982

[30] Foreign Application Priority Data

Dec. 22, 1981 [JP] Japan .............................. 56-206029
Dec. 23, 1981 [JP] Japan .............................. 56-207195
Dec. 23, 1981 [JP] Japan .............................. 56-207196

[51] Int. Cl.$^3$ .......................................... G01D 15/18
[52] U.S. Cl. .................................. 346/75; 346/140 R
[58] Field of Search ........................... 346/75, 140 R

[56] References Cited

U.S. PATENT DOCUMENTS 4,207,582 6/1980 Yamamoto ..................... 346/140 R
4,364,055 12/1982 Aiba .................................. 346/75 X Primary Examiner—Joseph W. Hartary
Attorney, Agent, or Firm—Guy W. Shoup

[57] ABSTRACT

An ink supply system of an ink jet recording apparatus of the charge control type including a supply pump for feeding ink under pressure to a recording head, an accumulator for equalizing the pressure of the ink, and valve means for controlling the feeding of the ink under pressure to the recording head. The supply pump, the accumulator and the valve means are located in a piping for supplying the ink in the ink tank to the recording head in the indicated order as seen from the ink tank side. A delivery pump is located in a piping for returning ink to the ink tank from a catcher for recovering the ink ejected through the recording head but not contributing to recording of information with ink drops. The ink supply system further includes conduits and change-over valves mounted between the ink tank, supply pump and delivery pump in such a manner that the ink supply system can be switched between a condition in which the ink in the ink tank can be fed under pressure to the recording head by the supply pump and a condition in which the ink in the ink tank can be filled in the supply pump through the recovery pump.

4 Claims, 8 Drawing Figures

INK SUPPLY SYSTEM OF INK JET RECORDING APPARATUS

FIELD OF THE INVENTION

This invention relates to ink jet recording apparatus of the electric charge control type, and more particularly it is concerned with an ink supply system of such ink jet recording apparatus comprising a supply pump for supplying ink under pressure to a recording head, an accumulator for equalizing the pressure of the ink and valve means for controlling the ink supplied under pressure to the recording head which are arranged, in the indicated order as viewed from the side of an ink tank, in a piping for supplying the ink in the ink tank to the recording head, wherein a recovery pump is located in a piping for recovering ink to the ink tank from a catcher for catching ink ejected through the recording head but not contributing to recording of information with ink drops.

DESCRIPTION OF THE PRIOR ART

Figure 1:
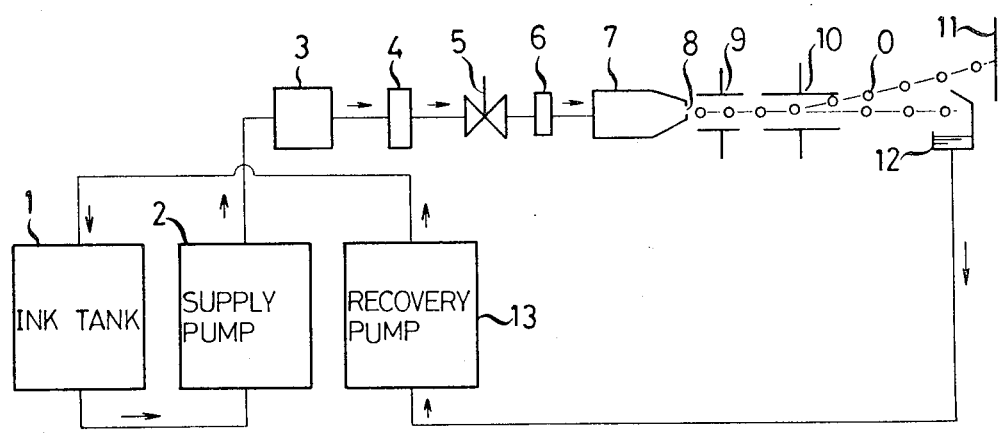
FIG. 1 is a systematic view of one example of the ink supply system of an ink jet recording apparatus of the prior art.

In principle, an ink jet recording apparatus of the electric charge control type operates such that pressurized ink is subjected to ultrasonic vibration and projected in a jet stream of water-based ink drops. The ink drops are electrically charged in accordance with printing signal voltages and made to travel in a predetermined electric field so that the ink drops will be deflected in accordance with the electric charge and strike a recording medium in a position corresponding to the printing signal to perform recording by forming dots.

One example of the apparatus of the prior art will be described by referring to FIG. 1. Ink in an ink tank 1 is supplied under pressure by a supply pump 2 through an accumulator 3, a filter 4, a control valve 5 and a protective filter 6 to a recording head 7 where a nozzle 8 is mounted for ejecting the ink in a jet stream of ink drops as the ink supplied under pressure is subjected to very small vibration by ultrasonic vibration generating means, not shown. In the path of travel of the ejected jet stream of ink drops, an electrically charging electrode 9 and a pair of deflecting electrodes 10 are mounted successively, the electrically charging electrode 9 being operative to electrically charge the ink drops in accordance with the printing signal voltage corresponding to a deflection from the reference line of dots forming letters, etc., to be recorded, and the pair of deflecting electrodes 10 being operative to hold a predetermined electric field. Ink drops 0 electrically charged by the electrically charging electrode 9 are deflected by an amount corresponding to the electric charge they carry while flying between the pair of deflecting electrodes 10 so as to strike a recording sheet 11 and perform recording thereon by forming dots corresponding to printing signals. Ink drops corresponding to portions of letter regions having no dots or portions of information to be recorded having no letters are not electrically charged, so that such ink drops travel straight between the deflecting electrodes 10 and are caught by a catcher 12 from which the ink is recovered by a recovery pump 13 and returned to the ink tank 1.

The supply pump 2 and recovery pump 13 are usually driven by solenoids or motors. In view of effecting control of ink supply and recovery, maintaining a necessary space and reducing cost, the supply and recovery pumps are preferably driven from a single common drive source.

When a constant flow rate pump is used as the supply pump 2, the flow rate per unit hour and pressure are determined by the diameter, stroke and repeat frequency of the piston. The nozzle of the recording head has a diameter of 30–50 μm, so that the volume of ejected ink is very small and the piston has a very small stroke. The smaller the piston stroke and the higher the frequency, the smaller becomes the pressure pulsation of the stream of ink from the supply pump 2. This offers the advantage that the accumulator 3 can have its volume reduced.

The supply pump 2 has a small volume and is high in frequency as aforesaid, so that when a charge of ink is not filled in the ink supply system (including a piping from the ink tank 1 to the recording head 7, a piping from the catcher 12 to the ink tank 1 and the component parts mounted along these pipings shown in FIG. 1), it is impossible for the supply pump 2 to fill itself with a charge of ink by its own force even if the ink tank 1 is filled with a charge of ink as by a cartridge. Thus it is impossible for the supply pump 2 to fill the ink supply system with a charge of ink by its own force.

To cope with this situation, it has hitherto been usual practice to deliver the recording apparatus to users in condition in which the ink tanks and the ink supply systems are filled with a charge of ink or to fill the ink tanks and the ink supply systems with a charge of ink separately by service personnels when they are delivered to the users. This practice of the prior art has had the disadvantages that in the former it is necessary to provide means to prevent leaks of ink due to the impact that might be applied to the recording apparatus during transportation and that in the latter the operation to be performed by service personnel becomes complicated.

SUMMARY OF THE INVENTION

This invention has as its object the provision of an ink jet recording apparatus in which the aforesaid disadvantage of the ink supply system of the ink jet recording apparatus of the prior art in connection with filling it with ink in initial stages of operation can be eliminated.

As aforesaid, the supply pump and recovery pump are preferably driven from the same drive source. However, it is necessary for the recovery pump to recover the ink in the catcher in a condition in which air is mingled therein, so that the recovery pump is required to have an ability which is several to several tens of times that of the supply pump.

In the invention, this high ability of the recovery pump is utilized for filling the supply pump with a charge of ink in initial stages of operation. To this end, conduits and change-over valves are mounted between the ink tank, supply pump and recovery pump to enable switching of the ink supply system between a condition in which the ink in the ink tank can be fed under pressure to the recording head by the supply pump and a condition in which the ink in the ink tank can be filled in the supply pump through the recovery pump.

DETAILED DESCRIPTION OF THE PREFERRED EMBODIMENTS

Figure 2:
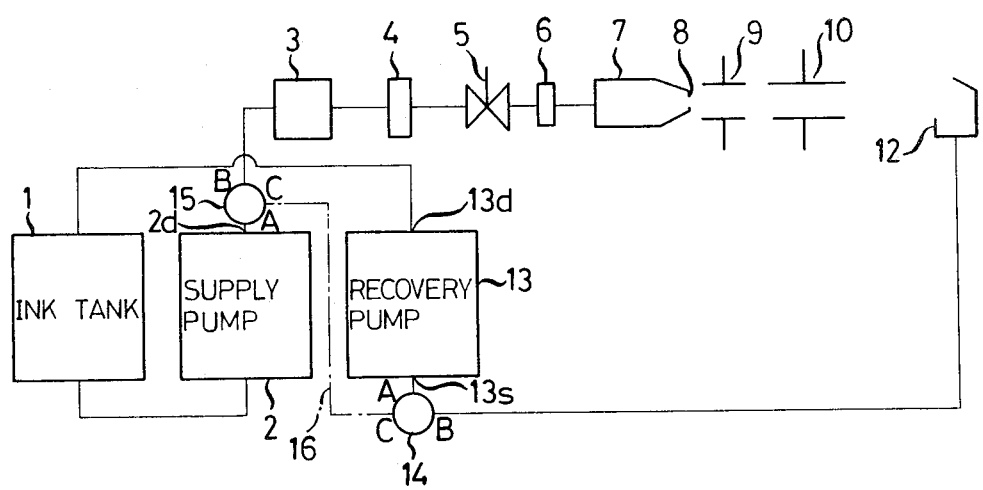
FIG. 2 is a systematic view of a first embodiment of the invention.
Figure 3:
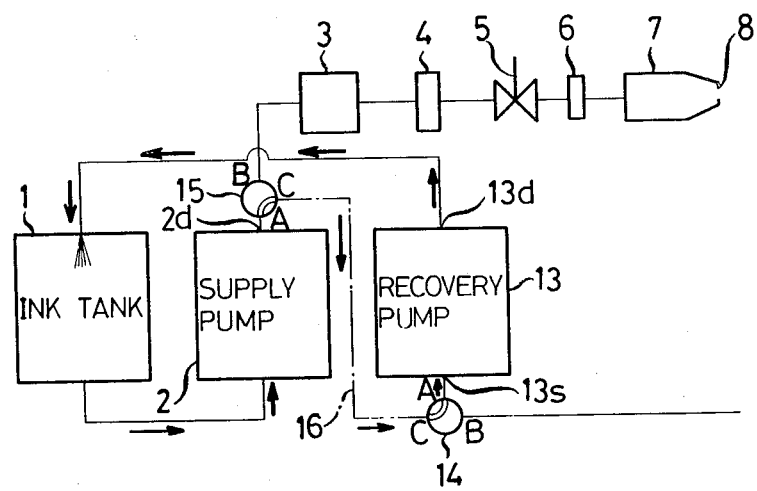
FIG. 3 is a systematic view showing the condition of the change-over valves and in explanation of the flow of ink in initial stages of ink charging.

FIGS. 2 and 3 are a systematic view and a schematic view of a first embodiment of the invention.

Referring to FIG. 2, a change-over valve 14 is mounted in a conduit connecting the catcher 12 to the recovery pump 13 in a position immediately before a suction side 13s of the recovery pump 13 and has a connection port A connected through a pipe to the suction side 13s of the recovery pump 13, a connection port B connected by the conduit to the catcher 12, and a connection port C connected through a conduit 16 to a connection port C of a change-over valve 15 mounted in an ink supply conduit immediately behind a discharge side 2d of the supply pump 2. The change-over valve 15 has a connection port A connected to the discharge side 2d of the supply pump 2, and a connection port C connected to the ink supply conduit.

The embodiment of the ink supply system shown in FIG. 2 is of the aforesaid construction. In initial stages of ink charging, the change-over valves 14 and 15 are closed between the connection ports A–B and open between the connection ports A–C as shown in FIG. 3. By actuating the recovery pump 13 while the system is in the aforesaid condition, a charge of ink newly filled in the ink tank 1 is drawn by suction into the recovery pump 13 through the supply pump 2, change-over valve 15, conduit 16 and change-over valve 14 and returned from the recovery pump 13 through a discharge side 13d thereof to the ink tank 1 in circulation, effecting initial filling of the supply pump 2 with a charge of ink.

In performing the aforesaid operation, it is advantageous to simultaneously actuate the recovery pump 13 and the supply pump 2 to achieve a smooth flow of the ink in the supply pump 2 and a removal of air and air bubbles from the supply pump 2.

After the supply pump 2 is filled with a charge of ink, the ink is filled in the supply system by the supply pump 2 by opening the change-over valves 14 and 15 between the communication ports A–B and closing the communication ports A–C thereof, to enable the normal recording operation to be performed as described by referring to FIG. 1.

Figure 4:
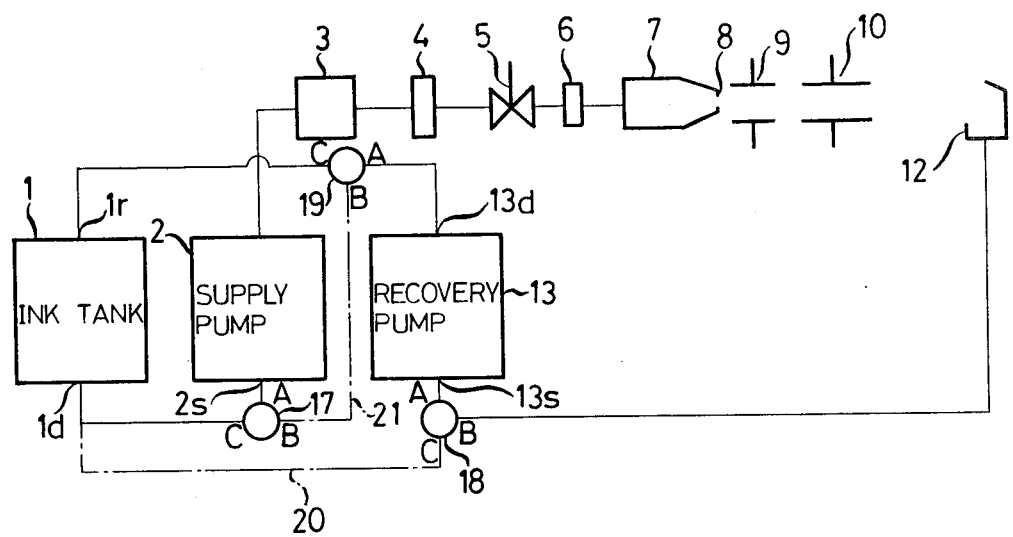
FIG. 4 is a systematic view of a second embodiment of the invention.

FIG. 4 shows a second embodiment in which a change-over valve 18 is mounted on a suction side 13s of the recovery pump 13 and has a connection port A connected to a suction side 13s of the recovery pump 13, a connection port B connected to the catcher 12 through a conduit, and a communication port C connected through a conduit 20 to a delivery side 1d of the ink tank 1. A change-over valve 17 is mounted in a suction side 2s of the supply pump 2 and has a connection port A connected to a suction side 2s of the supply pump 2, a connection port B connected through a conduit 21 to a connection port B of a change-over valve 19 mounted on a discharge side 13d of the recovery pump 13, and a connection port C connected to the delivery side 1d of the ink tank 1. The change-over valve 19 has a connection port A connected to the discharge side 13d of the recovery pump 13, a connection port B connected to the connection port B of the change-over valve 17 as described hereinabove, and a connection port C on a recovery side 1r of the ink tank 1.

Figure 5:
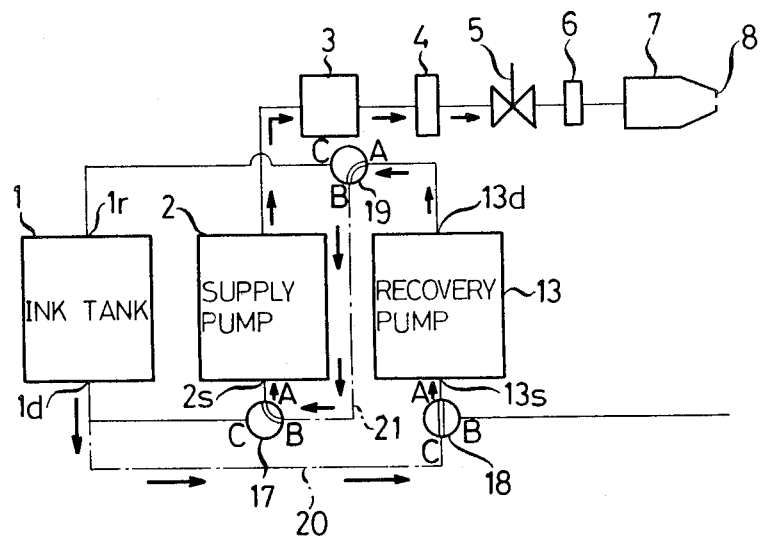
FIG. 5 is a systematic view showing the conditions of the change-over valve and in explanation of the flow of ink in initial stages of ink charging.

In performing initial filling of an ink charge by using the embodiment of the system of the aforesaid construction, the three change-over valves are brought to the following conditions as shown in FIG. 5:

|  | Open | Closed |
| --- | --- | --- |
| Valve 17 | A-B | A-C |
| Valve 18 | A-C | A-B |
| Valve 19 | A-B | A-C |

When the recovery pump 13 is actuated after an ink cartridge is mounted in the ink tank 1, the ink in the ink tank 1 is drawn by suction into the recovery pump 13 through the conduit 20 and change-over valve 18, and fed under pressure through the change-over valve 19, conduit 21 and change-over valve 17 to the suction side 2s of the supply pump 2, to thereby raise the pressure in the supply system up to the control valve 5 mounted in the ink supply line. In this embodiment also, it is preferable to actuate the supply pump 2 simultaneously as the recovery pump 13 is actuated to facilitate flow of the ink in the pump and removal of air and air bubbles from the interior of the pump. When initial filling of the supply pump with a charge of ink is completed as aforesaid, the change-over valves 17, 18 and 19 are brought to the following condition:

|  | Open | Closed |
| --- | --- | --- |
| Valve 17 | A-C | A-B |
| Valve 18 | A-B | A-C |
| Valve 19 | A-C | A-B |

When the change-over valves 17, 18 and 19 are in the aforesaid condition, the connection of the component parts of the supply system is the same as that of the prior art shown in a systematic view in FIG. 1. Upon the control valve 5 being opened by suitable pressure sensing means, not shown, the supply pump 2 starts feeding of the ink, to enable a normal recording operation to be performed.

Figure 6:
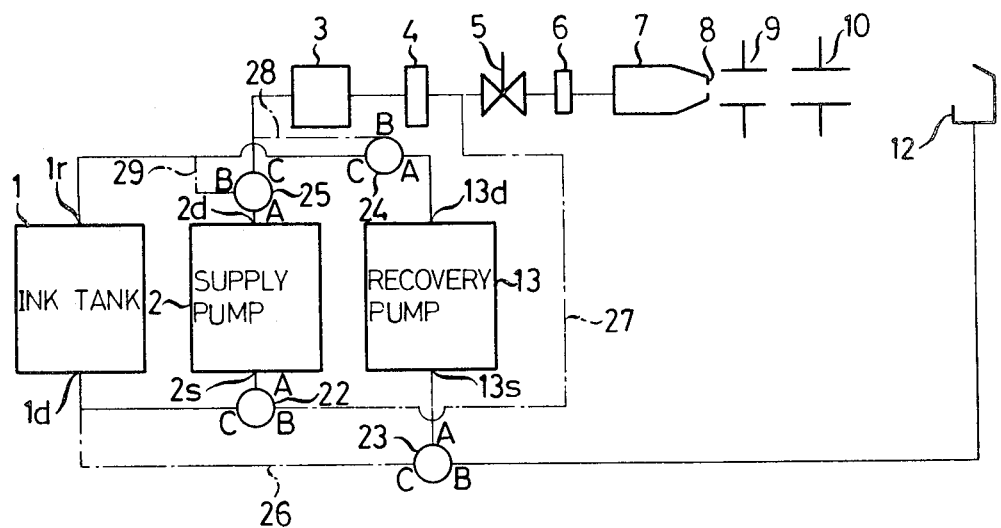
FIG. 6 is a systematic view of a third embodiment of the invention.
Figure 7:
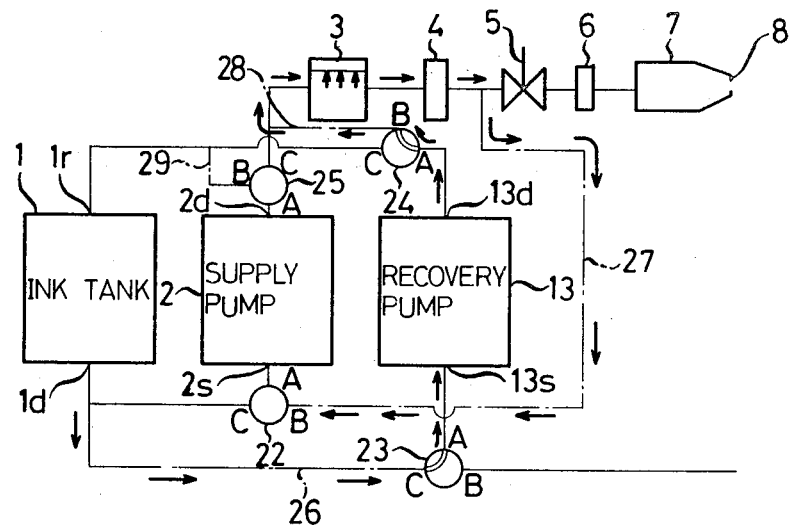
FIGS. 7 and 8 are systematic views showing the condition of the change-over valves and in explanation of the flow of ink in initial stages of ink charging.
Figure 8:
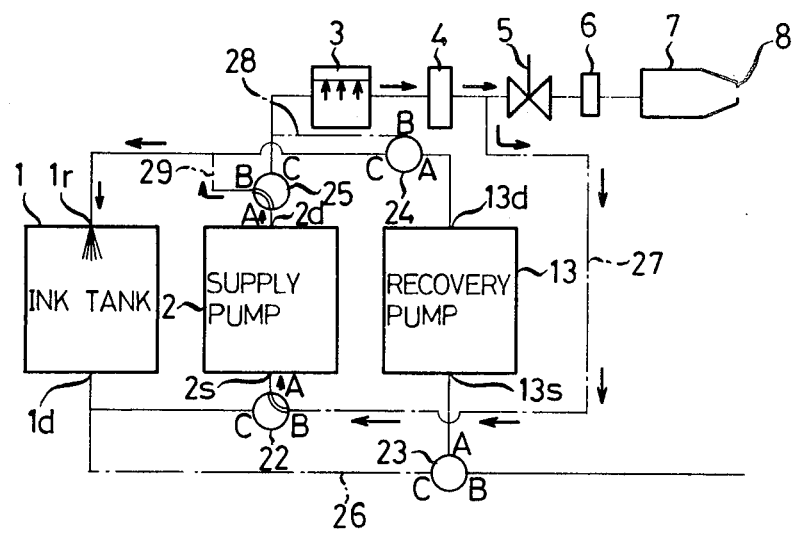

FIG. 6 shows a third embodiment in which the accumulator of the recording apparatus is utilized in addition to the recovery pump for effecting initial charging of ink. In this embodiment, a change-over valve 23 is mounted immediately before the suction side 13s of the recovery pump 13 in a conduit connecting the catcher 12 to the recovery pump 13 and has connection ports A and B connected to conduits and a connection port C connected to the delivery side 1d of the ink tank 1 through a conduit 26. A change-over valve 22 is mounted on the suction side 2s of the supply pump 2 and has a connection port A connected to the suction side 2s of the supply pump 2, a connection port B connected to an ink supply line between the filter 4 and the control valve 5 through a conduit 27, and a connection port C connected to the delivery side 1d of the ink tank 1. A change-over valve 24 is mounted on the discharge side 13d of the recovery pump 13 and has a connection port A connected to the discharge side of the recovery pump 13, a connection port B connected to the ink supply line before the accumulator 3 through a conduit 8, and a connection port C connected to the recovery side 1r of the ink tank 1. A change-over valve 25 is mounted on the discharge side 2d of the supply pump 2 and has a connection port A connected to the discharge side of the supply pump 2, a connection port B connected to the recovery side 1r of the ink tank 1 through a conduit 29, and a connection port C connected to an ink supply line connected to the accumulator 3.

When initial ink charging is performed by using the embodiment of the aforesaid construction, the four change-over valves are in the following condition:

|  | Open | Closed |
| --- | --- | --- |
| Valve 22 |  | A-B, A-C |
| Valve 23 | A-C | A-B |
| Valve 24 | A-B | A-C |
| Valve 25 |  | A-B, A-C |

When an ink cartridge is mounted in the ink tank 1 and the recovery pump 13 is actuated when the change-over valves 22-25 are in the aforesaid condition, the ink in the ink tank 1 is drawn by suction through the conduit 26 and change-over valve 23 into the recovery pump 13 and discharged through the discharge side 13d of the pump 13. The discharged ink is stored in a line system between the change-over valve 24 and the change-over valve 22 before the suction side 2s of the supply pump 2 extending through the conduit 28 and accumulator 3 and in the accumulator 3. Then by opening the change-over valve 21 between the connection ports A-B and opening the change-over valve 25 between the connection ports A-B, the ink stored in the accumulator 3 returns by pressure differential to the ink tank 1 through the supply pump 2, valve 25 and conduit 29, to thereby effect initial filling of the supply pump 2 with a charge of ink. In performing the aforesaid operation, the supply pump 2 is advantageously be actuated at the same time because the ink can be made to flow smoothly in the supply pump 2 and air and air bubbles therein can be readily removed, as is the case with the embodiments described previously.

When the supply pump 2 has been filled with a charge of ink, the change-over valves 22-25 are brought to the following condition:

|  | Open | Closed |
| --- | --- | --- |
| Valve 22 | A-C | A-B |
| Valve 23 | A-B | A-C |
| Valve 24 | A-C | A-B |
| Valve 25 | A-C | A-B |

As a result, the parts of the supply system are connected together in the same manner as shown in the systematic view shown in FIG. 1. Thus by actuating the supply pump 2, the ink supply system can be filled with a charge of ink to carry out a normal recording operation.

In the embodiments shown and described hereinabove, the change-over valves 14, 15, 17, 18, 19, 22, 23, 24 and 25 are preperably ones capable of switching connections electrically. However, even if they are manually operable valves, initial ink charging operations can be performed much more readily with less trouble than operations of the prior art.

From the foregoing description, it will be appreciated that the invention provides an ink supply system which makes it possible to readily effect, by utilizing a recovery pump alone or with an accumulator provided in an ink jet recording apparatus of the electric charge control type, so that the operation of filling the apparatus with a charge of ink when the apparatus are shipped or delivered to the users that have hitherto been necessary to perform can be eliminated. Thus various problem raised by this requirement of the prior art can be eliminated.

What is claimed is:

1. An ink supply system of an ink jet recording apparatus of the electric charge control type comprising a supply pump for feeding ink under pressure to a recording head, an accumulator for equalizing the pressure of the ink, and valve means for controlling the feeding of the ink under pressure to the recording head, said supply pump, said accumulator and said valve means being located in a piping for supplying the ink in an ink tank to the recording head in the indicated order as seen from the ink tank side, and a delivery pump located in a piping for returning ink to the ink tank from a catcher for recovering the ink ejected through the recording head but not contributing to recording of information with ink drops, characterized by comprising conduits and change-over valves mounted between said ink tank, said supply pump and said deliver pump in such a manner that the ink supply system can be switched between a condition in which the ink in the ink tank can be fed under pressure to the recording head by the supply pump and a condition in which the ink in the ink tank can be filled in the supply pump through the recovery pump.

2. An ink supply system as claimed in claim 1, wherein said conduits and said change-over valves enabling switching of the ink supply system between said two conditions comprise a conduit connecting a suction side of said recovery pump to a discharge side of said supply pump, and change-over valves capable of switching between said conduit and the ink supply piping and the ink recovery piping of the ink supply system.

3. An ink supply system as claimed in claim 1, wherein said conduits and said change-over valves enabling switching of the ink supply system between said two conditions comprise a conduit connecting a supply side of said ink tank to a suction side of said recovery pump, a conduit connecting a discharge side of said recovery pump and a suction side of said supply pump, and change-over valves capable of switching between said conduits and the ink supply pipe and the ink recovery piping of the ink supply system.

4. An ink supply system as claimed in claim 1, wherein said conduits and a said change-over valves enabling switching of the ink supply system between said two conditions comprise a conduit connecting a supply side of said ink tank and a suction side of said recovery pump, a conduit connecting a discharge side of said delivery pump to the ink supply piping of the ink supply system upstream of said accumulator, a conduit connecting a suction side of said supply pump to said ink supply piping in a position between said accumulator and said valve means for controlling the feeding of the ink under pressure, a conduit connecting a discharge side of said supply pump to a recovery side of said ink tank, and change-over valves capable of switching between said conduits and said ink supply piping and the ink delivery piping of the ink supply system.

* * * * *